United States Patent
Kumar et al.

(10) Patent No.: US 9,703,982 B2
(45) Date of Patent: Jul. 11, 2017

(54) DOCUMENT DISTRIBUTION AND INTERACTION

(71) Applicant: Adobe Systems Incorporated, San Jose, CA (US)

(72) Inventors: Divij Kumar, New Delhi (IN); Neha Saxena, New Delhi (IN); Aditya Kumar Pandey, New Delhi (IN); Nikhil Dang, New Delhi (IN); Pulkit Jain, New Delhi (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 100 days.

(21) Appl. No.: 14/534,583

(22) Filed: Nov. 6, 2014

(65) Prior Publication Data
US 2016/0132693 A1    May 12, 2016

(51) Int. Cl.
| | | |
|---|---|---|
| G06F 7/04 | (2006.01) | |
| G06F 21/62 | (2013.01) | |
| G06F 21/16 | (2013.01) | |
| G06F 17/30 | (2006.01) | |
| G10L 17/00 | (2013.01) | |
| G06F 21/32 | (2013.01) | |

(52) U.S. Cl.
CPC .... *G06F 21/6245* (2013.01); *G06F 17/30011* (2013.01); *G06F 21/16* (2013.01); *G06F 21/32* (2013.01); *G10L 17/00* (2013.01)

(58) Field of Classification Search
CPC .......... G06F 21/6245; G06F 17/30011; G06F 21/16; G06F 21/32; G10L 17/00
See application file for complete search history.

(56) References Cited

U.S. PATENT DOCUMENTS

| | | |
|---|---|---|
| 4,621,334 A | 11/1986 | Garcia |
| 4,805,222 A | 2/1989 | Young |
| 5,825,880 A | 10/1998 | Sudia et al. |
| (Continued) | | |

OTHER PUBLICATIONS

Craig Le Clair, "What to Look for in E-Signature Providers" (Nov. 15, 2011). Available at https://www.echosign.adobe.com/content/dam/echosign/docs/pdfs/Forrester_What_To_Look_For_In_E-Signature_Providers_Nov_2011.pdf.

(Continued)

*Primary Examiner* — Techane Gergiso
(74) *Attorney, Agent, or Firm* — Finch & Maloney PLLC

(57) ABSTRACT

An electronic signature comprises an authenticated audio and/or visual recording of a spoken assent that conforms to a pre-established phrase. Alternatively, an electronic signature comprises an authenticated visual recording of a series of physical gestures that conforms to a pre-established sequence. Rules are established with respect to how the assent is to be recorded and authenticated. These rules, as well as the document itself, are provided to a document recipient. If the document recipient assents to the document, an audio and/or visual recording of the assent is generated. Location information that defines or approximates the geographical location where the document recipient recorded the assent is also optionally recorded as well. Once recorded, the assent can be authenticated using any of a variety of suitable authentication processes. An authenticated assent can be considered a legally binding electronic signature that forms a part of, or is otherwise associated with, the document.

20 Claims, 8 Drawing Sheets

(56) References Cited

U.S. PATENT DOCUMENTS

| | | | |
|---|---|---|---|
| 5,910,987 A | 6/1999 | Ginter et al. |
| 6,073,101 A | 6/2000 | Maes |
| 6,091,835 A | 7/2000 | Smithies et al. |
| 6,157,935 A | 12/2000 | Tran et al. |
| 6,240,091 B1 | 5/2001 | Ginzboorg et al. |
| 6,615,234 B1 | 9/2003 | Adamske et al. |
| 6,691,089 B1 | 2/2004 | Su et al. |
| 6,928,421 B2 | 8/2005 | Craig et al. |
| 6,959,382 B1 | 10/2005 | Kinnis et al. |
| 7,206,938 B2 | 4/2007 | Bender |
| 7,562,053 B2 | 7/2009 | Twining |
| 7,581,109 B2 | 8/2009 | De Boursetty et al. |
| 7,694,143 B2 | 4/2010 | Karimisetty et al. |
| 7,779,355 B1 | 8/2010 | Erol et al. |
| 7,895,166 B2 | 2/2011 | Foygel et al. |
| 7,996,367 B2 | 8/2011 | Foygel et al. |
| 7,996,439 B2 | 8/2011 | Foygel et al. |
| 8,126,868 B1 | 2/2012 | Vincent |
| 8,230,232 B2 | 7/2012 | Ahmed |
| 8,234,494 B1 | 7/2012 | Bansal et al. |
| 8,332,253 B1 | 12/2012 | Farmer |
| 8,443,443 B2 | 5/2013 | Nordstrom |
| 8,844,055 B2 | 9/2014 | Follis et al. |
| 8,918,311 B1 | 12/2014 | Johnson et al. |
| 8,930,308 B1 | 1/2015 | Johnson et al. |
| 9,058,515 B1 | 6/2015 | Amtrup et al. |
| 9,292,876 B1 | 3/2016 | Shimkus |
| 2001/0002485 A1 | 5/2001 | Brisbee |
| 2002/0038290 A1 | 3/2002 | Cochran et al. |
| 2002/0062322 A1 | 5/2002 | Genghini |
| 2002/0091651 A1 | 7/2002 | Petrogiannis |
| 2002/0095290 A1 | 7/2002 | Kahn et al. |
| 2002/0103656 A1 | 8/2002 | Bahler et al. |
| 2003/0009513 A1 | 1/2003 | Ludwig et al. |
| 2003/0037004 A1 | 2/2003 | Buffum et al. |
| 2003/0074216 A1 | 4/2003 | Salle |
| 2003/0083906 A1 | 5/2003 | Howell et al. |
| 2003/0154083 A1 | 8/2003 | Kobylevsky et al. |
| 2003/0187671 A1 | 10/2003 | Kumhyr et al. |
| 2003/0217275 A1 | 11/2003 | Bentley et al. |
| 2004/0102959 A1 | 5/2004 | Estrin |
| 2004/0139344 A1* | 7/2004 | Maurer ............ H04L 9/3247 |
| | | | 726/26 |
| 2004/0167847 A1 | 8/2004 | Nathan |
| 2004/0187037 A1 | 9/2004 | Checco |
| 2004/0204939 A1 | 10/2004 | Liu et al. |
| 2004/0225887 A1 | 11/2004 | O'Neil et al. |
| 2004/0243811 A1 | 12/2004 | Frisch et al. |
| 2004/0264652 A1 | 12/2004 | Erhart et al. |
| 2005/0228665 A1 | 10/2005 | Kobayashi |
| 2005/0228999 A1 | 10/2005 | Jerdonek et al. |
| 2005/0289345 A1* | 12/2005 | Haas ............ G07D 7/0006 |
| | | | 713/170 |
| 2006/0020460 A1 | 1/2006 | Itou |
| 2006/0041828 A1 | 2/2006 | King et al. |
| 2006/0110011 A1 | 5/2006 | Cohen et al. |
| 2006/0122880 A1 | 6/2006 | Franco |
| 2006/0143462 A1 | 6/2006 | Jacobs |
| 2006/0157559 A1 | 7/2006 | Levy et al. |
| 2006/0212813 A1* | 9/2006 | Yalovsky ............ G06F 17/241 |
| | | | 715/700 |
| 2006/0253324 A1 | 11/2006 | Miller |
| 2006/0280339 A1 | 12/2006 | Cho |
| 2007/0055517 A1 | 3/2007 | Spector |
| 2007/0113164 A1* | 5/2007 | Hansen ............ G06Q 10/10 |
| | | | 715/209 |
| 2007/0124507 A1 | 5/2007 | Gurram et al. |
| 2007/0143398 A1 | 6/2007 | Graham |
| 2007/0220614 A1 | 9/2007 | Ellis et al. |
| 2007/0226511 A1 | 9/2007 | Wei et al. |
| 2008/0015883 A1 | 1/2008 | Hermann |
| 2008/0177550 A1 | 7/2008 | Mumm et al. |
| 2008/0180213 A1 | 7/2008 | Flax |
| 2008/0195389 A1 | 8/2008 | Zhang et al. |
| 2008/0209229 A1 | 8/2008 | Ramakrishnan |
| 2009/0025087 A1 | 1/2009 | Peirson |
| 2009/0062944 A1 | 3/2009 | Wood et al. |
| 2009/0112767 A1 | 4/2009 | Hammad |
| 2009/0116703 A1 | 5/2009 | Schultz |
| 2009/0117879 A1 | 5/2009 | Pawar et al. |
| 2009/0177300 A1 | 7/2009 | Lee |
| 2009/0222269 A1 | 9/2009 | Mori |
| 2009/0228584 A1* | 9/2009 | Maes ............ G06F 9/542 |
| | | | 709/224 |
| 2009/0254345 A1 | 10/2009 | Fleizach et al. |
| 2009/0260060 A1 | 10/2009 | Smith et al. |
| 2009/0307744 A1* | 12/2009 | Nanda ............ G06F 21/335 |
| | | | 726/1 |
| 2009/0327735 A1 | 12/2009 | Feng et al. |
| 2010/0131533 A1* | 5/2010 | Ortiz ............ G06F 17/3028 |
| | | | 707/758 |
| 2010/0161993 A1 | 6/2010 | Mayer |
| 2010/0281254 A1 | 11/2010 | Carro |
| 2010/0306670 A1* | 12/2010 | Quinn ............ G06Q 10/1095 |
| | | | 715/753 |
| 2011/0022940 A1 | 1/2011 | King et al. |
| 2011/0047385 A1 | 2/2011 | Kleinberg |
| 2011/0212717 A1* | 9/2011 | Rhoads ............ G06F 17/30241 |
| | | | 455/420 |
| 2011/0225485 A1 | 9/2011 | Schnitt |
| 2012/0072837 A1 | 3/2012 | Triola |
| 2012/0190405 A1 | 7/2012 | Kumaran |
| 2012/0254332 A1 | 10/2012 | Irvin |
| 2013/0046645 A1 | 2/2013 | Grigg et al. |
| 2013/0089300 A1 | 4/2013 | Soundararajan et al. |
| 2013/0103723 A1 | 4/2013 | Hori |
| 2013/0132091 A1 | 5/2013 | Skerpac |
| 2013/0138438 A1 | 5/2013 | Bachtiger |
| 2013/0166915 A1 | 6/2013 | Desai et al. |
| 2013/0179171 A1 | 7/2013 | Howes |
| 2013/0182002 A1 | 7/2013 | Macciola et al. |
| 2013/0191287 A1 | 7/2013 | Gainer et al. |
| 2013/0263283 A1 | 10/2013 | Peterson |
| 2013/0269013 A1 | 10/2013 | Parry et al. |
| 2013/0283189 A1 | 10/2013 | Basso et al. |
| 2013/0326225 A1 | 12/2013 | Murao |
| 2013/0339358 A1 | 12/2013 | Huibers et al. |
| 2014/0019761 A1 | 1/2014 | Shapiro |
| 2014/0019843 A1 | 1/2014 | Schmidt |
| 2014/0078544 A1 | 3/2014 | Motoyama et al. |
| 2014/0079297 A1 | 3/2014 | Tadayon et al. |
| 2014/0236978 A1 | 8/2014 | King et al. |
| 2014/0279324 A1 | 9/2014 | King |
| 2014/0282243 A1* | 9/2014 | Eye ............ G06F 3/0482 |
| | | | 715/810 |
| 2014/0294302 A1 | 10/2014 | King et al. |
| 2014/0343943 A1 | 11/2014 | Al-Telmissani |
| 2014/0365281 A1 | 12/2014 | Onischuk |
| 2014/0372115 A1 | 12/2014 | LeBeau et al. |
| 2015/0012417 A1 | 1/2015 | Joao et al. |
| 2015/0016661 A1 | 1/2015 | Lord |
| 2015/0063714 A1 | 3/2015 | King et al. |
| 2015/0073823 A1 | 3/2015 | Ladd |
| 2015/0100578 A1 | 4/2015 | Rosen et al. |
| 2015/0127348 A1* | 5/2015 | Follis ............ H04L 9/3247 |
| | | | 704/260 |
| 2015/0172058 A1 | 6/2015 | Follis |
| 2015/0213404 A1 | 7/2015 | Follis |
| 2015/0294094 A1 | 10/2015 | Hefeeda |
| 2016/0078869 A1 | 3/2016 | Syrdal et al. |

OTHER PUBLICATIONS

U.S. Appl. No. 14/069,674, filed Nov. 1, 2013.

Simske, Steven J. Dynamic Biometrics: The Case for a Real-Time Solution to the Problem of Access Control, Privacy and Security. 2009 First IEEE International Conference on Biometrics, Identiy and Security. Pub. Date: 2009. http://ieeexplore.ieee.org/stamp/stamp.jsp?tp=&arnumber=5507535.

Maeder, Anthony; Fookes, Clinton; Sridharan, Sridha. Gaze Based User Authentication for Personal Computer Applications. Proceedings of 2004 International Symposium on Intelligent Multimedia,

(56) References Cited

OTHER PUBLICATIONS

Video and Speech Processing. Pub. Date: 2004. http://ieeexplore.ieee.org/stamp/stamp.jsp?tp=&arnumber=1434167.
Notice of Allowance received in U.S. Appl. No. 14/625,852 (sent Jul. 25, 2016).
Notice of Allowance received in U.S. Appl. No. 14/107,967 (sent Nov. 3, 2016) (6 pages).
Notice of Allowance received in U.S. Appl. No. 14/551,560 (sent Nov. 4, 2016) (19 pages).
Araújo et al., "User Authentication Through Typing Biometrics Features", IEEE Transactions on Signal Processing, vol. 53, No. 2, pp. 851-855 (2005).
Deng et al., "Keystroke Dynamics User Authentication Based on Gaussian Mixture Model and Deep Belief Nets", ISRN Signal Processing, vol. 2013, Article ID 565183, 7 pages (2013).
Moskovitch et al., "Identity Theft, Computers and Behavioral Biometrics", Proceedings of the 2009 IEEE International Conference on Intelligence and Security Informatics, pp. 155-160 (2009).
Notice of Allowance in related U.S. Appl. No. 14/859,944 sent Mar. 1, 2017, 10 pages.

* cited by examiner

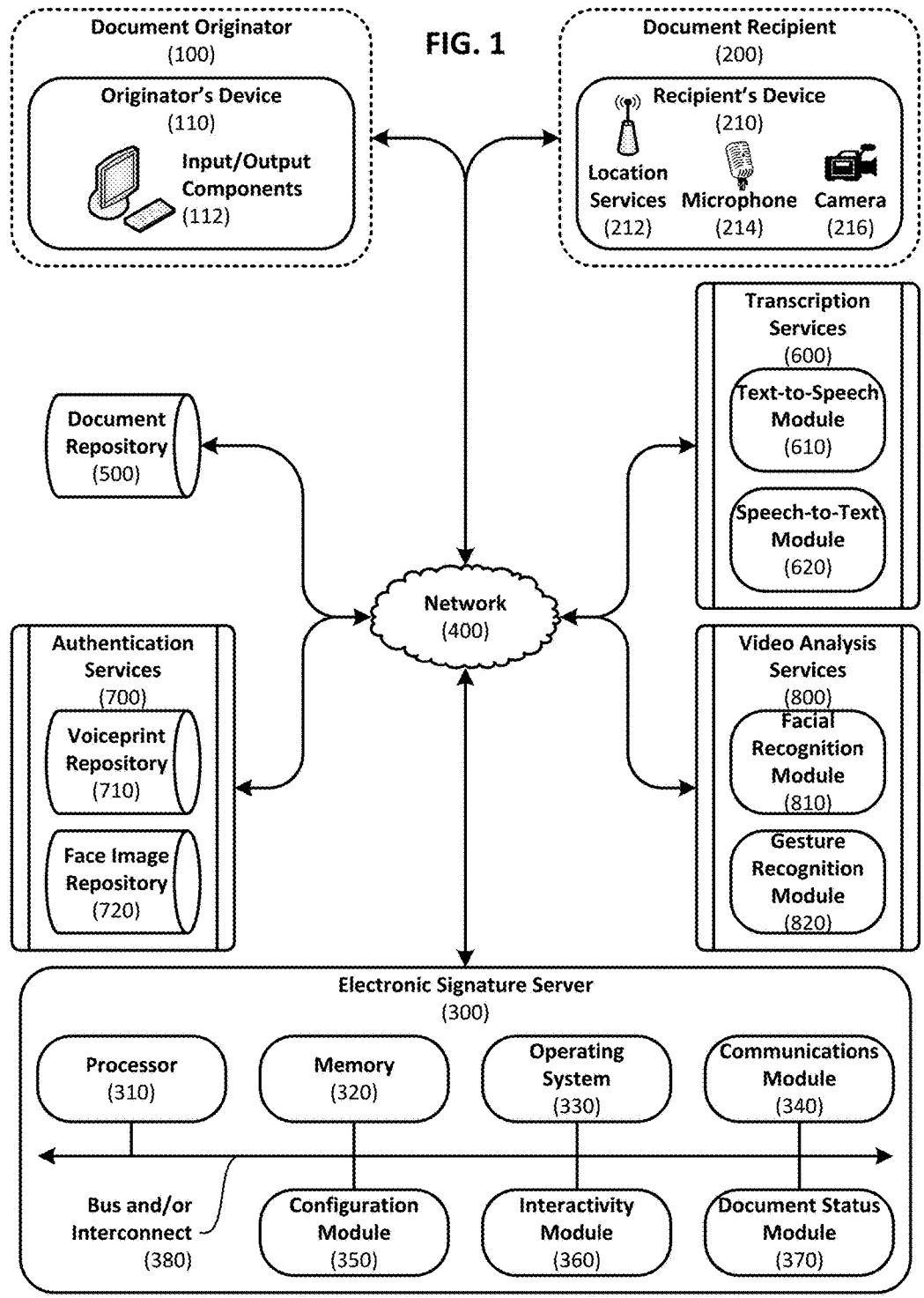

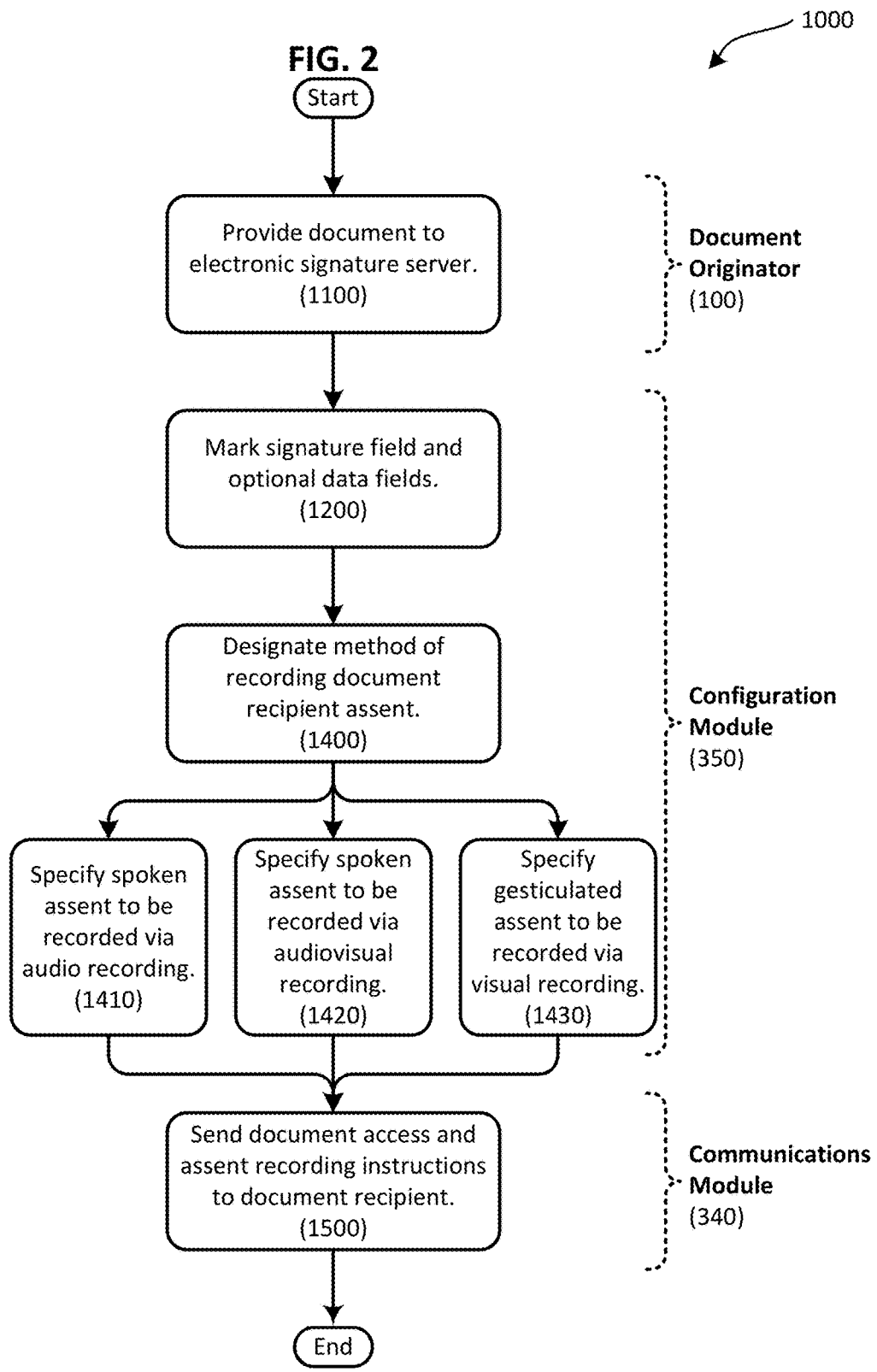

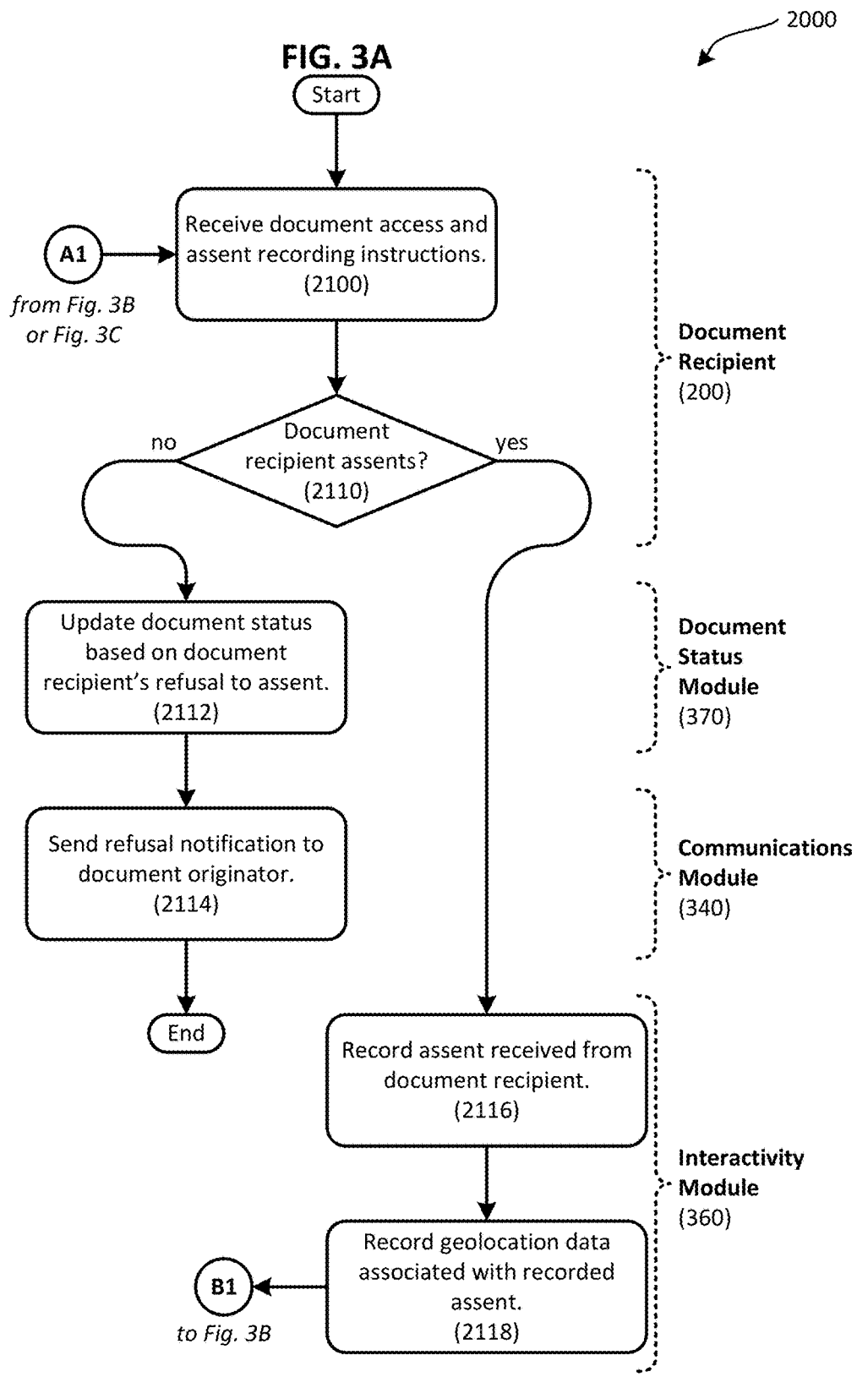

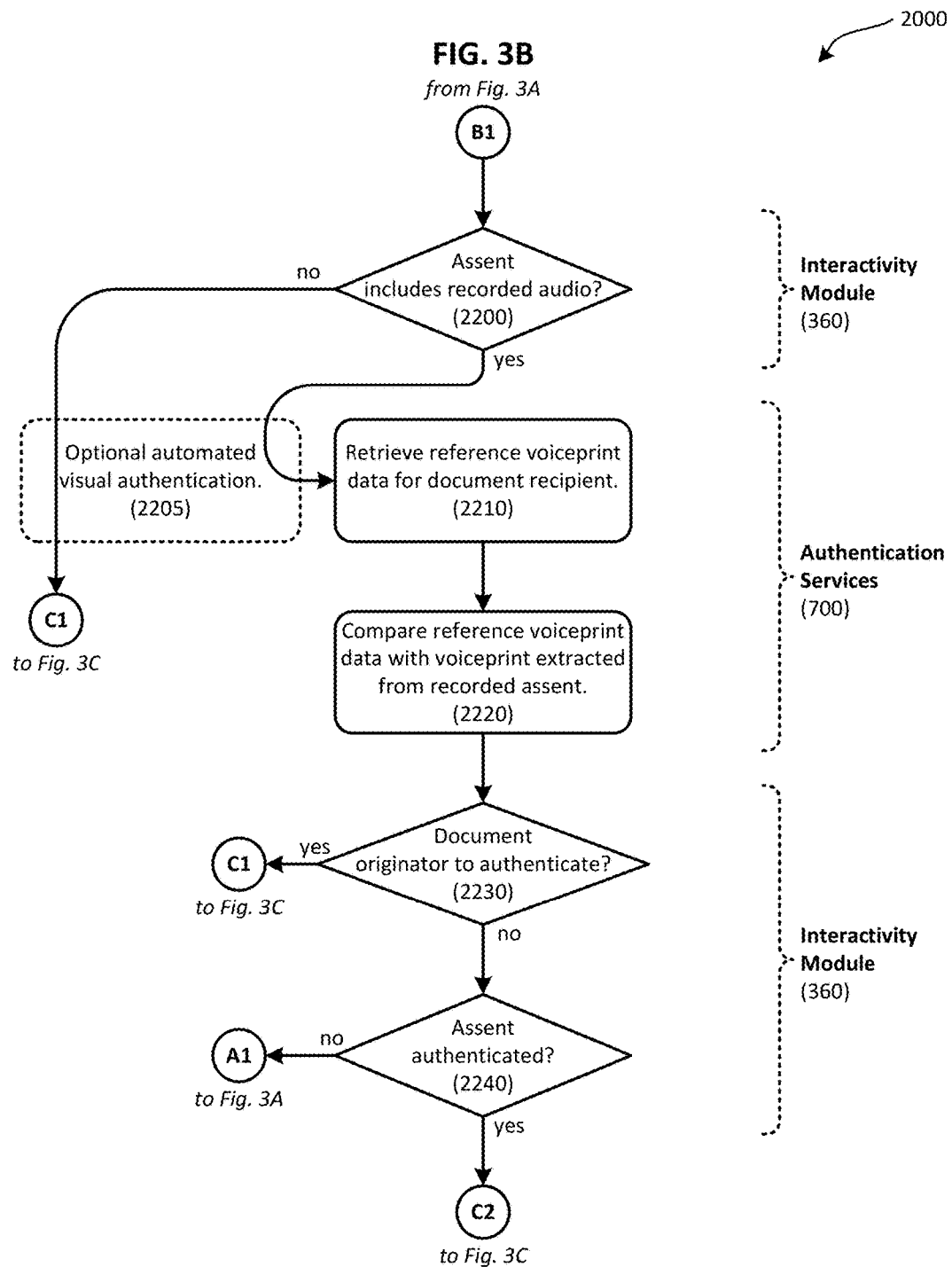

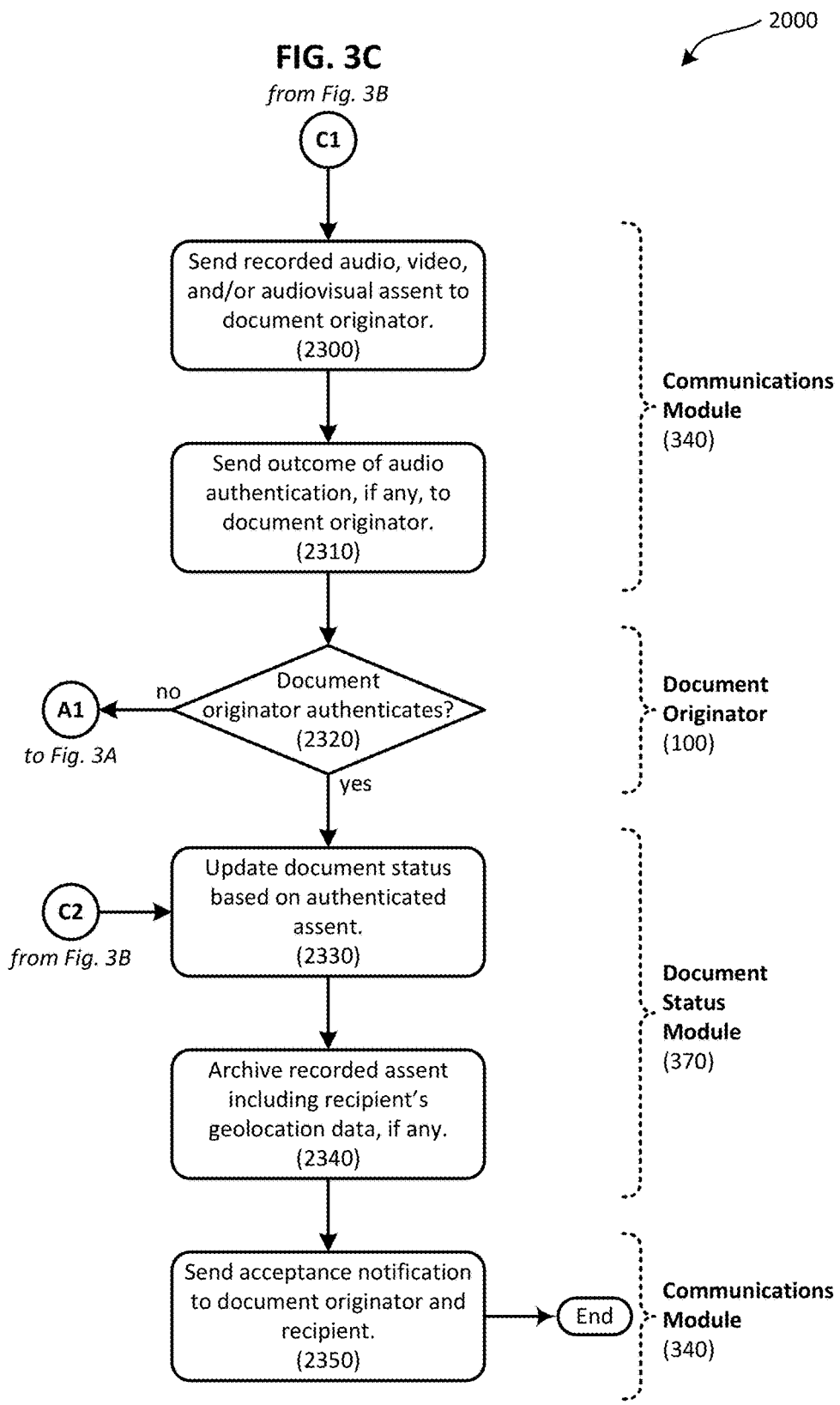

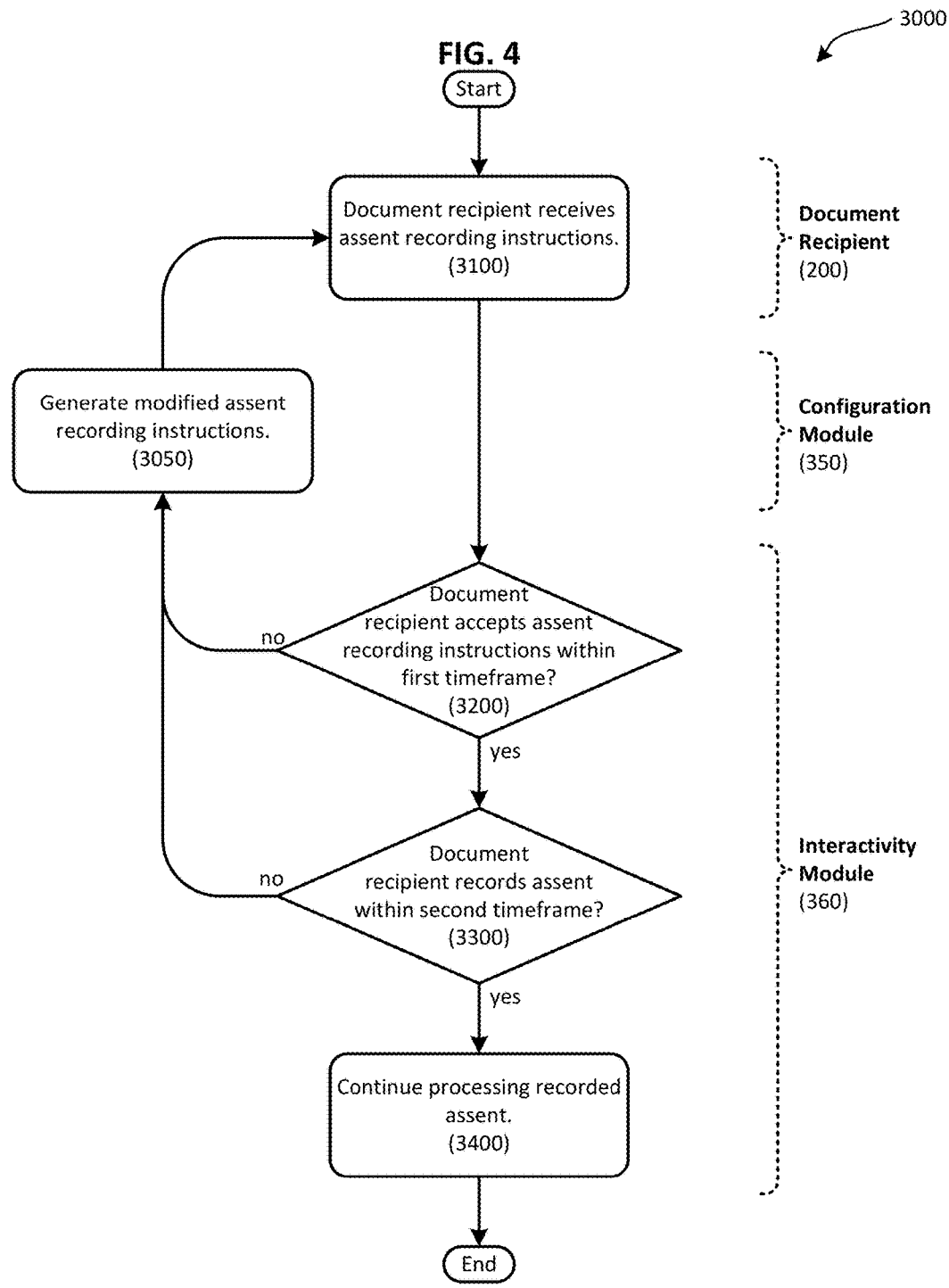

FIG. 5B

520 contribute to identity theft. Personal information such as social security numbers, bank account numbers, or credit card numbers (other than a check or credit card authorization form PTO-2038 submitted for payment purposes) is never required by the USPTO to support a petition or an application. If this type of personal information is included in documents submitted to the USPTO, petitioners/applicants should consider redacting such personal information from the documents before submitting them to the USPTO. Petitioner/applicant is advised that the record of a patent application is available to the public after publication of the application (unless a non-publication request in compliance with 37 CFR 1.213(a) is made in the application) or issuance of a patent. Furthermore, the record from an abandoned application may also be available to the public if the application is referenced in a published application or an issued patent (see 37 CFR 1.14). Checks and credit card authorization forms PTO-2038 submitted for payment purposes are not retained in the application file and therefore are not publicly available.

LEGAL NAME OF INVENTOR

Inventor: Mike Sharperson

Signature: Mike Sharperson    Date (Optional): _____

Note: An application data sheet (PTO/SB/14 or equivalent), including naming the entire inventive entity, must accompany this form or must have been previously filed. Use an additional PTO/AIA/01 form for each additional inventor.

This collection of information is required by 35 U.S.C. 115 and 37 CFR 1.63. The information is required to obtain or retain a benefit by the public which is to file (and by the USPTO to process) an application. Confidentiality is governed by 35 U.S.C. 122 and 37 CFR 1.11 and 1.14. This collection is estimated to take 1 minute to complete, including gathering, preparing, and submitting the completed application form to the USPTO. Time will vary depending upon the individual case. Any comments on the amount of time you require to complete this form and/or suggestions for reducing this burden, should be sent to the Chief Information Officer, U.S. Patent and Trademark Office, U.S. Department of Commerce, P.O. Box 1450, Alexandria, VA 22313-1450. DO NOT SEND FEES OR COMPLETED FORMS TO THIS ADDRESS. SEND TO: Commissioner for Patents, P.O. Box 1450, Alexandria, VA 22313-1450.

*If you need assistance in completing the form, call 1-800-PTO-9199 and select option 2.*

Authenticated Signatory's Name (220)

Authenticated Signatory's Image Snapshot (227)

DOCUMENT DISTRIBUTION AND INTERACTION

FIELD OF THE INVENTION

This disclosure relates generally to document processing workflows, and more specifically to workflows that enable documents to be distributed, assented to, and otherwise interacted with orally and/or visually.

BACKGROUND

Computers and electronic documents have become an increasingly indispensable part of modern life. In particular, as virtual storage containers for binary data, electronic documents have gained acceptance not only as a convenient replacement for conventional paper documents, but also as a useful way to store a wide variety of digital assets such as webpages, sound recordings, and videos. The increased use of electronic documents has resulted in the adaptation of conventional paper-based document processing workflows to the electronic realm. One such adaptation has been the increased use and acceptance of electronic signatures on agreements, contracts, and other documents. When negotiating parties reach an agreement with respect to a course of action, state of affairs, or other subject matter, the resulting agreement is usually reduced to writing and executed by the parties as a way to memorialize the terms of the agreement. Traditionally, a physical copy of the agreement was executed with a personalized stamp, seal, or handwritten signature. However, since this "reduction to writing" now often takes the form of an electronic document stored on a computer readable medium, electronic signatures have become commonplace and have indeed gained widespread legal recognition. See, for example, the Electronic Signatures in Global and National (ESIGN) Commerce Act, 15 U.S.C. §96. Even where an agreement is never actually reduced to writing, the resulting "oral contract" may still be enforceable if evidentiary questions as to the substance of the underlying agreement can be resolved. The wide variety of different formats and legal requirements relating to agreements has resulted in a correspondingly wide variety of workflows—both conventional and electronic—that facilitate the negotiation, formation, execution, and management of agreements, contracts, and other documents.

BRIEF DESCRIPTION OF THE DRAWINGS

FIG. 1 is a block diagram illustrating selected components of an example system that allows documents to be distributed, assented to, and otherwise interacted with orally and/or visually.

FIG. 2 is a flowchart illustrating an example method for configuring a document prior to soliciting and authenticating an oral and/or visual electronic signature.

FIGS. 3A through 3C comprise a flowchart illustrating an example method for soliciting and authenticating an oral and/or visual electronic signature on a document.

FIG. 4 is a flowchart illustrating an example method for soliciting an oral and/or visual electronic signature on a document within a predetermined timeframe.

FIG. 5B illustrates an example graphical representation of a document that is associated with an authenticated visual electronic signature, wherein the document includes an image snapshot.

DETAILED DESCRIPTION

Figure 5A:
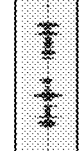
FIG. 5A illustrates an example graphical representation of a document that is associated with an authenticated oral electronic signature, wherein the document includes a vocal waveform.

While many efficiencies and benefits have been derived from the implementation of workflows based on electronic signatures, such workflows still suffer from a number of shortcomings and disadvantages. For example, many existing electronic signature systems require a user to generate a graphical representation of his/her signature using a stylus, mouse, touch sensitive surface, or other digital pointing device. Digital pointing devices such as these tend to generate only a rough representation of a person's signature that cannot be authenticated with the same degree of confidence as a conventional pen-and-paper signature. Such processes can also be awkward and cumbersome, especially when implemented using portable devices such as smartphones and tablet computers where a pointing device may be unavailable, and/or where only a limited touchscreen area is available for drawing a signature. While some of these shortcomings have been addressed by systems that insert a computer-generated graphical representation of a signature into a document, this gives rise to a host of other concerns, particularly relating to fraud prevention. For instance, in such implementations it can be difficult to establish that the inserted signature was actually inserted or authorized by the intended signatory since, in many cases, the inserted signature may not even be unique to the signatory. In particular, the security of existing identity- and knowledge-based authentication solutions can be compromised when accounts are hacked because of weak or leaked passwords, or when social research reveals trusted knowledge. These disadvantages represent substantial obstacles to the further deployment of electronic signature workflows, especially given the problems that can arise when the authenticity of signature is suspect. For example, if the authenticity of a signature on a contract is questionable, a party to the contract may later suggest that the signature is illegitimate and attempt to renege on the contract.

Thus, and in accordance with certain of the embodiments disclosed herein, improved document processing workflows enable documents to be distributed, assented to, and otherwise interacted with orally and/or visually. For example, in one implementation an electronic signature comprises an authenticated audio and/or visual recording of a spoken assent that conforms to a pre-established phrase. In another implementation an electronic signature comprises an authenticated visual recording of a series of physical gestures that conforms to a pre-established sequence. Rules are established with respect to how the assent is to be recorded and authenticated. These rules, as well as the document itself, are provided to a document recipient. If the document recipient assents to the document, an audio and/or visual recording of the assent is generated. This can be accomplished in an easy and straightforward manner with any suitable device having a camera and/or a microphone, including portable devices such as smartphones and tablet computers. Location information that defines or approximates the geographical location where the document recipient recorded the assent is also optionally recorded as well. Once recorded, the assent can be authenticated using any of a variety of suitable authentication processes. An authenticated assent can be considered a legally binding electronic signature that forms a part of, or is otherwise associated with, the document.

A wide range of techniques can be used to authenticate the recorded assent. For example, in one embodiment the recorded assent is authenticated by analyzing a voiceprint extracted from the assent. The extracted voiceprint can be compared to a reference voiceprint provided by an authentication service. The reference voiceprint can be obtained from the document recipient directly, such as may be recorded during an initial registration process, or it can be culled from sounds recorded from prior interactions the signatory may have had with the electronic signature service or other online services. The recorded assent can additionally or alternatively be provided to the document originator for authentication, thus giving the document originator an opportunity to review the recorded assent before it becomes a binding electronic signature.

Certain of the embodiments disclosed herein are not only easier to use than existing systems that rely on a graphical representation of a signature, but they also result in a signature that can be authenticated with a higher degree of confidence and that is difficult to repudiate. For example, because cameras and microphones have become ubiquitous components on modern portable devices, documents can be signed easily without the need for a specialized device. Moreover, an electronic signature that comprises a visual and/or audio recording of the signatory's assent can be authenticated with a significantly higher degree of confidence than existing electronic signature techniques that rely on a user- or computer-generated graphical representation of a signature. This makes it more difficult for the signatory to repudiate the signature, and likewise, makes it more difficult for someone to impersonate the signatory. It also results in an electronic signature that is supported by a more robust audit trail.

As used herein, the term "document" refers, in addition to its ordinary meaning, to any collection of information that can be communicated between users of the various systems disclosed herein. As used herein, the term "document terms" refers, in addition to its ordinary meaning, to content provided within, or accessible via, a document. A document can take the form of a physical object, such as one or more papers containing printed information, or in the case of an "electronic document", a computer readable medium containing digital data. Electronic documents can be rendered in a variety of different ways, such as via display on a screen, by printing using an output device, or aurally using an audio player and/or text-to-speech software. Thus, it will be appreciated that electronic documents may include digital assets in addition to or instead of text; such digital assets may include, for example, audio clips, video clips, photographs, and other multimedia assets. Documents may encompass a virtually unlimited range of subject matter, including documents that contain terms that are to be agreed to amongst various participants in a given workflow. Examples of such documents include agreements, settlements, and legally binding contracts. For instance, both a word processing file containing the terms of a legally enforceable contract as well as a compressed audio file containing an audio recording of the same contract terms would both be considered "documents" for the purposes of this disclosure. Such textual and audio components may be combined into a single "document" in certain embodiments. Documents may be communicated amongst users by a variety of techniques ranging from physically moving papers containing printed matter to wired and/or wireless transmission of digital data.

As used herein, the term "document originator" (or "originator") refers, in addition to its ordinary meaning, to a user or entity that represents the source of a document in a workflow. Likewise, the term "document recipient" (or "recipient") refers, in addition to its ordinary meaning, to a user or entity that represents the target of a document in a workflow. Thus, in a generalized workflow, a document originator can be understood as sending a document to a document recipient. It will be appreciated that a document originator may not necessarily be the creator, author, or generator of a particular document, but rather may simply be a user or entity that initiates a workflow by sending a document to a recipient. Likewise, the document recipient may not be the ultimate recipient of a document, particularly where a document is routed amongst multiple users in a given workflow. Thus, a single user or entity may act as both a document originator and a document recipient in different contexts. It will also be appreciated that the terms document originator and document recipient are not limited to people or users, but may also refer to entities, organizations, workstations, or computing devices which originate or receive documents as part of a workflow. Finally, a given workflow may not necessarily involve the document itself being transmitted from document originator to document recipient; in some cases other data relating to a document, such as metadata and/or a network address, may be transmitted between a document originator or a document recipient.

As used herein, the term "electronic signature" refers, in addition to its ordinary meaning, to data that can be attached to or logically associated with an electronic document. Thus an electronic signature may comprise, for example, a string of characters, a digital key, a bitmap image such as an image of a handwritten signature, an audio and/or visual recording of a person reciting a spoken phrase such as "I agree to these terms", a visual recording of a person performing a sequence of physical gestures, or any suitable combination of the foregoing. Electronic signatures may or may not be encrypted or otherwise encoded in a way that limits access and/or modification by unauthorized parties. An electronic signature may be personalized and associated with a particular individual, or may be generated automatically in response to a specified user input, such as the selection of an electronic checkbox, the clicking of a button in a graphical user interface, or the generation of a touchtone using a telephone keypad. It will be appreciated that an electronic signature need not necessarily be incorporated into a particular electronic document, but may simply be stored in a resource managed by, for example, an electronic signature server, which can then create a logical association between the electronic signature and a particular electronic document. Where an electronic signature is encoded using binary digits, it may also be referred to as a "digital signature". Examples of products which provide services associated with an electronic signature server include Adobe Echo Sign (Adobe Systems Incorporated, San Jose, Calif.) and DocuSign eSignature (DocuSign, Inc., San Francisco, Calif.).

As used herein, the term "assent" refers, in addition to its ordinary meaning, to an expression of agreement, for example to the terms of a document. For instance, an assent can take the form of a handwritten signature, an audio and/or visual recording of a person reciting a spoken phrase such as "I agree to these terms", a visual recording of a person performing a sequence of physical gestures, or any suitable combination of the foregoing. An assent which is recorded and authenticated can be understood as constituting an electronic signature, such as a legally binding electronic signature.

As used herein, the term "social network content" refers, in addition to its ordinary meaning, to content generated, shared, and/or otherwise transmitted using any of a variety of computer-based tools intended to facilitate interaction amongst users. Such tools may include applications, utilities, and other online platforms provided by, for example, blogging services, microblogging services, text messaging services, instant messaging services, or any other appropriate social network subcomponents. Thus, for example, in certain embodiments social network content may include tweets broadcast by users of the Twitter social network service (Twitter Inc., San Francisco, Calif.), audio and/or audiovisual recordings posted by users of the Facebook social network service (Facebook Inc., Menlo Park, Calif.), postings with multimedia generated by users of the Google+ social network service (Google Inc., Mountain View, Calif.), and/or blog entries submitted by users of the Tumblr microblogging platform (Yahoo! Inc., Sunnyvale, Calif.). Social network content may include a wide variety of data including but not limited to text, network addresses, audio recordings, audiovisual recordings, and other multimedia assets from which audio can be extracted. Social network content may also sometimes be referred to as "social media".

System Architecture

FIG. 1 is a block diagram illustrating selected components of an example system that allows documents to be distributed, assented to, and otherwise interacted with orally and/or visually. More specifically, the system illustrated in FIG. 1 can be understood as enabling a document originator 100 and a document recipient 200 to interact with each other in a workflow that is managed by an electronic signature server 300. In such embodiments, document originator 100, document recipient 200, and electronic signature server 300 can communicate with each other via a network 400. Network 400 can also be used to access supplementary services and resources, such as a networked document repository 500, transcription services 600, and authentication services 700. Additional or alternative services and resources may be provided in other embodiments. In some cases one or more of such services and resources may be integrated into and provided by one or more of document originator 100, document recipient 200, or electronic signature server 300, as will be described in turn. Thus other embodiments may have fewer or more networked services and/or resources depending on the granularity of implementation. It will therefore be appreciated that the various embodiments disclosed herein are not limited to provision or exclusion of any particular services and/or resources.

As illustrated in FIG. 1, document originator 100 has access to a device 110 that includes input/output components 112 such as a keyboard, a touchscreen display, or any other appropriate input/output device. For example, in certain embodiments, device 110 may comprise one or more of a variety of suitable computing devices, including devices such as handheld computers, cellular telephones, tablet computers, smartphones, laptop computers, desktop computers, and set-top boxes. Other devices or combinations of devices may be used in other embodiments. Device 110 enables document originator 100 to interact with other users and/or other components of the various systems that are illustrated in FIG. 1 and/or described herein. For example, in certain embodiments device 110 includes a wired and/or wireless communications module that enables communication via network 400. In general, device 110 may include additional or alternative components as compared to those illustrated in FIG. 1, and it will be appreciated that the various embodiments disclosed herein are not limited to any particular configuration of device 110 used by document originator 100.

In certain embodiments, device 110 provides functionality that enables document originator 100 to generate a new document, modify an existing document, or retrieve an existing document from a storage device, such as a local storage device, networked document repository 500, or storage resources hosted by electronic signature server 300. Documents may also be received from other users as part of a larger overarching workflow. For example, in one embodiment device 110 can be used to draft a new bill of sale for an automobile that document originator 100 wishes to sell. In another embodiment a contract provider can send an email to document originator 100 containing standard terms of an automobile bill of sale which originator 100 can then modify to conform to the particular requirements of a particular application. In any case, document originator 100 can use input/output components 112 to generate a document that includes a wide range of digital assets. The various components that comprise the digital asset can be stored together as a single document or may be stored separately but remain connected by a logical association such as a network link.

Still referring to FIG. 1, document recipient 200 has access to a device 210 that includes components such as location services 212, a microphone 214, and a camera 216. Device 210 may include other input/output components such as a keyboard, a display, and/or a touchscreen display. For example, in certain embodiments device 210 comprises a handheld computer, a cellular telephone, a tablet computer, a smartphone, a laptop computer, a desktop computer, or a set-top box. Other devices or combinations of devices can be used in other embodiments. In general, device 210 enables document recipient 200 to interact with other users and/or other components of the various systems that are illustrated in FIG. 1 and/or described herein. For example, device 210 may comprise a smartphone capable of connecting to other components via cellular data connection. In other embodiments device 210 includes a wired and/or wireless communications module that enables digital communication via network 400. In modified embodiments device 210 may include additional or alternative components as compared to those illustrated in FIG. 1, and it will be appreciated that the various embodiments disclosed herein are not limited to any particular configuration of device 210 used by document recipient 200.

In certain embodiments device 210 provides functionality that enables document recipient 200 to interact with and respond to a received document by, for example, using microphone 214 and/or camera 216 to record an assent to the document terms. In particular, a spoken phrase by the recipient, such as "I agree to these terms," can be recorded, digitized, incorporated into, and stored together with the received document. The recording can be an audio recording or an audiovisual recording. In an alternative implementation, a sequence of gestures, with or without audio, can be recorded. Location services 212 are optionally leveraged to record location information that defines or approximates the geographical location where the document recipient recorded the assent. Electronic signature server 300 can also be configured to record and/or respond appropriately to feedback indicating that document recipient 200 does or does not assent to the terms of the received document. Regardless of whether the document recipient 200 responds with a prerecorded response or otherwise, the response can be incorporated into and stored together with the received document. The resulting modified document can be further processed according to a pre-established workflow.

Referring still to the example embodiment illustrated in FIG. 1, electronic signature server 300 can be configured to manage and orchestrate workflows that enable documents provided by document originator 100 to be distributed to document recipient 200, and that enable document recipient 200 to electronically sign, assent to the terms of, or otherwise interact with such documents. To this end, electronic signature server 300 includes one or more modules configured to implement certain of the functionalities disclosed herein, and optionally further includes hardware configured to enable such implementation. This hardware may include, but is not limited to, a processor 310, a memory 320, an operating system 330, and a communications module 340. Processor 310 can be any suitable processor, and may include one or more coprocessors or controllers, such as an audio processor or a graphics processing unit, to assist in processing operations of electronic signature server 300. Memory 320 can be implemented using any suitable type of digital storage, such as one or more of a disk drive, a universal serial bus (USB) drive, flash memory, and/or random access memory. Operating system 330 may comprise any suitable operating system, such as Google Android (Google Inc., Mountain View, Calif.), Microsoft Windows (Microsoft Corp., Redmond, Wash.), or Apple OS X (Apple Inc., Cupertino, Calif.). As will be appreciated in light of this disclosure, the techniques provided herein can be implemented without regard to the particular operating system provided in conjunction with electronic signature server 300, and therefore may also be implemented using any suitable existing or subsequently developed platform. Communications module 340 can be any appropriate network chip or chipset which allows for wired and/or wireless communication via network 400 to external components such as one or more of the other components described herein. A bus and/or interconnect 380 may also be provided to allow for inter- and intra-device communications using, for example, communications module 340.

In certain embodiments electronic signature server 300 includes a configuration module 350 that enables document originator 100 to define how a document should be assented to and how such assent can be authenticated. For example, configuration module 350 can be used to specify whether an audio recording, a visual recording, or an audiovisual recording of the assent should be generated. In embodiments where a document recipient 200 must perform a sequence of gestures that is recorded, configuration module 350 can be used to define the required sequence, and optionally, a time period within which such sequence must be accepted and/or completed. Configuration module 350 is also optionally used to define how a recorded assent is authenticated, such as by leveraging authentication services 700 or by providing document originator 100 with a copy of the recorded assent for review and approval.

Electronic signature server 300 may also include an interactivity module 360 configured to provide an interface to users accessing the workflows and resources managed by electronic signature server 300. Such an interface may be provided by way of a graphical user interface rendered on a digital display, although other types of interfaces, such as voice response, touchtone, or textual interfaces, can be implemented as well. The user interfaces can be provided to one or more document originators 100 and/or one or more document recipients 200. For example, in one embodiment interactivity module 360 is configured to generate a graphical user interface capable of receiving commands, parameters, and/or other metadata that define a workflow from document originator 100. Such parameters may specify, for example, how a particular document is to be routed amongst one or more document recipients 200 and how electronic signature server 300 should respond to various interactions between a particular document recipient 200 and the particular document. Likewise, interactivity module 360 can also be configured to generate a user interface capable of guiding a document recipient 200 through the process of receiving, reviewing, assenting to (or declining to assent to), and/or otherwise interacting with a document. Additional or alternative workflow aspects may be specified in other embodiments, and thus it will be appreciated that the various embodiments disclosed herein are not limited to any particular functionality provided by interactivity module 360.

Referring still to FIG. 1, electronic signature server 300 may also include a document status module 370 in certain embodiments. Document status module 370 can be configured to manage the status of documents used in a workflow that is orchestrated by electronic signature server 300. To this end, in certain embodiments document status module 370 comprises a document status database or other document status data structure that stores information with respect to documents used in a given workflow. Such information may indicate, for example, whether a particular document has been submitted for signature to a particular document recipient 200, and/or whether document recipient 200 has recorded an assent to the document, has declined to assent to the document, or has invoked another workflow process (such as by forwarding the document to an alternative document recipient). Such information may also indicate whether a recorded assent has been authenticated, for example by leveraging authentication services 700 or by submitting the recorded assent to document originator 100 for review and approval. The data structure provided by document status module 370 may be stored locally at electronic signature server 300, may be stored remotely at a networked document status repository, or may be stored in the same document repository as the document itself, such as in networked document repository 500. Document status module 370 may further comprise software and/or instructions configured to manage such a data structure. In certain embodiments a user can use interactivity module 360 to obtain information from document status module 370, such as by submitting a query to search for, for example, unsigned documents in a given workflow, or the status or audit trail of a particular document in a given workflow.

Certain embodiments of the system illustrated in FIG. 1 may include supplementary resources and services, such as networked document repository 500, transcription services 600, and video analysis services 800. For example the documents managed using the various systems disclosed herein can be stored in a dedicated networked document repository 500, thus advantageously allowing such documents to be accessed by a wide variety of document originators 100 and/or document recipients 200 without regard to whether other components of the system are available at any given time. However in other embodiments documents may be retained in storage that is local to electronic signature server 300, such as provided by memory 320, or in storage that is local to document originator 100 and/or document recipient 200. Transcription services 600 may include a text-to-speech module 610 and/or a speech-to-text module 620 which can be used, respectively, to generate an audio version of a document or to transcribe a spoken response received from a document recipient 200. Video analysis services 800 may include a facial recognition module 810 and/or a gesture recognition module 820 which can be used, respectively, to recognize facial features or gestures that are recorded in a visual assent that is received from document recipient 200. Providing such services by networked resources advantageously eliminates any need for such services to be provided locally at document originator's device 110 or at document recipient's device 210. This allows document originators 100 and document recipients 200 to leverage the functionality provided by electronic signature server 300 without the need to obtain specialized hardware or software, thereby providing networked functionality to users of devices having limited processing capability, such as public kiosks, smartphones, and tablet computers. Thus in certain embodiments transcription services 600 and/or video analysis services 800 may be integrated into and provided by electronic signature server 300.

Another example of supplementary services provided in certain embodiments are authentication services 700. Authentication services 700 can be configured to authenticate and authorize document originators 100 and/or document recipients 200 before providing access to resources associated with electronic signature server 300, before authenticating a recorded assent such that a legally binding electronic signature is created, or before enabling other functionalities. Authentication can be provided by any appropriate existing or subsequently developed authentication scheme. For example, in certain embodiments document recipient 200 can be required to provide a password, a public key, a private key, or other authorization token before being able to view a document or record an assent to a document. In other embodiments, the authentication token provided by document recipient 200 takes the form of a voiceprint extracted from a spoken or gesticulated assent. If the extracted voiceprint matches or substantially matches a voiceprint that is saved in a voiceprint repository 710 or that is otherwise obtained by authentication services 710, then the recorded assent can be authenticated and considered to be a legally binding electronic signature. In such implementations the voiceprints can be considered to be substantially matching where there exists a reasonably high likelihood that the voiceprints were generated by the same person. The voiceprint saved in voiceprint repository 710 can be provided as part of an initial registration process, or it can be culled from sounds recorded from prior interactions the signatory may have had with the electronic signature service or other online services.

In another embodiment, the authentication token provided by document recipient 200 additionally or alternatively takes the form of a facial image extracted from a spoken or gesticulated assent. For example, in such embodiments if the extracted facial image matches or substantially matches a facial image that is saved in a face image repository 720, then the recorded assent can be authenticated and considered to be a legally binding electronic signature. In yet another embodiment authentication includes gesture recognition performed on an audiovisual recording received from document recipient 200. In general, authentication and authorization services can be provided separately, wherein authorization depends on whether a specified authentication procedure was successful. For example, in certain embodiments a geographical location, device identifier, user identifier, or timestamp associated with document recipient 200 may be used to perform authentication. Metadata extraction processes used to support authentication may include extensible metadata platform (XMP) metadata extraction from a recording provided by document recipient 200. It will be appreciated that the authorization procedures disclosed herein are optional, and that such procedures may be omitted entirely in some embodiments. In other embodiments authentication procedures can be applied to individual documents, such that document originator 100 may specify a password, spoken passphrase, or other key for a particular document that document recipient 200 must provide before the document is allowed to be accessed, signed, or otherwise responded to. This provides document originator 100 with some assurance that the document has not been accessed, executed, or otherwise interacted with by an unauthorized party.

Document originator 100, document recipient 200, and electronic signature server 300 can communicate with each other via network 400. Network 400 can also be used to access supplementary services and resources, such as networked document repository 500, transcription services 600, and authentication services 700. Network 400 may be a local area network (such as a home-based or office network), a wide area network (such as the Internet), or a combination of such networks, whether public, private, or both. For example, in certain embodiments at least a portion of the functionality associated with network 400 is provided by a cellular data network, thereby making it easier for users of smartphones and tablet computers to interact with electronic signature server 300. In general, communications amongst the various entities, resources, and services described herein may occur via wired and/or wireless connections, such as may be provided by Wi-Fi or mobile data networks. In some cases access to resources on a given network or computing system may require credentials such as a username and password, and/or may require compliance with any other suitable security mechanisms. Furthermore, while only one document originator 100 and one document recipient 200 are illustrated in the example embodiment of FIG. 1, it will be appreciated that in general the system may comprise a distributed network of tens, hundreds, thousands, or more document originators 100 and/or document recipients 200 capable of interacting with a correspondingly large number of electronic signature servers 300.

The embodiments disclosed herein can be implemented in various forms of hardware, software, firmware, and/or special purpose processors. For example, in one embodiment a non-transitory computer readable medium has instructions encoded thereon that, when executed by one or more processors, cause one or more of the document distribution and interaction methodologies disclosed herein to be implemented. The instructions can be encoded using any suitable programming language, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into other software applications, such as document management systems or document viewers. For example an application configured to view portable document format (PDF) files can be configured to implement certain of the functionalities disclosed herein upon detecting the presence of signature fields or other metadata in a given document, including signature fields intended for a handwritten signature. The systems disclosed herein may also optionally leverage services provided by other software applications, such as electronic mail readers. The computer software applications disclosed herein may include a number of different modules, sub-modules, or other components of distinct functionality, and can provide information to, or receive information from, still other components and/or subcomponents. These modules can be used, for example, to communicate with input and/or output devices such as a display screen, a touch sensitive surface, a printer, and/or any other suitable input/output device. Other components and functionality not reflected in the illustrations will be apparent in light of this disclosure, and it will be appreciated that the various embodiments disclosed herein are not limited to any particular hardware or software configuration. Thus in other embodiments electronic signature server 300 may comprise additional, fewer, or alternative subcomponents as compared to those included in the illustrated embodiments.

The aforementioned non-transitory computer readable medium may be any suitable medium for storing digital information, such as a hard drive, a server, a flash memory, and/or random access memory. In alternative embodiments, the computers and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that the present disclosure is not intended to be limited to any particular system architecture.

Methodology

FIG. 2 is a flowchart illustrating an example method 1000 for configuring a document prior to soliciting and authenticating an oral and/or visual electronic signature. FIGS. 3A through 3C comprise a flowchart illustrating an example method 2000 for soliciting and authenticating an oral and/or visual electronic signature on a document. FIG. 4 is a flowchart illustrating an example method 3000 for soliciting an oral and/or visual electronic signature on a document within a predetermined timeframe. As can be seen, these methods include a number of phases and sub-processes, the sequence of which may vary from one embodiment to another. However, when considered in the aggregate, these phases and sub-processes form a complete document distribution and interaction process that is responsive to user commands in accordance with certain of the embodiments disclosed herein. These methodologies can be implemented, for example, using the system architecture illustrated in FIG. 1 and described herein. However other system architectures can be used in other embodiments, as will be apparent in light of this disclosure. To this end, the correlation of the various functionalities shown in FIG. 2, FIGS. 3A through 3C, and FIG. 4 to the specific components illustrated in FIG. 1 is not intended to imply any structural and/or use limitations. Rather, other embodiments may include, for example, varying degrees of integration where multiple functionalities are effectively performed by one system. For example, in an alternative embodiment, a single module can be used to provide user interactivity and maintenance of document status. Thus other embodiments may have fewer or more modules depending on the granularity of implementation. Numerous variations and alternative configurations will be apparent in light of this disclosure.

As illustrated in FIG. 2, method 1000 commences with document originator 100 providing a document to electronic signature server 300. See reference numeral 1100 in FIG. 2. This can be accomplished, for example, by uploading or providing a location of a document to server 300 from networked document repository 500 or from local storage provided at document originator's device 110. In some cases document originator 100 provides the document to electronic signature server 300 on his/her own accord. In other cases document originator 100 provides the document to electronic signature server 300 in response to a request for a document, such as a request from document recipient 200. For example, a new customer (document recipient) may request a license agreement from a software vendor (document originator), in response to which the software vendor provides a new license agreement to electronic signature server 300 and configures the rules that govern how the new consumer's electronic signature should be solicited on the license agreement. Regardless of how method 1000 commences, configuration module 350 is used to mark one or more signature fields, as well as one or more optional data fields identified in the provided document. See reference numeral 1200 in FIG. 2. Such field marking can be performed automatically based on any suitable field detection algorithm, or can be performed based partially or solely on input from document originator 100. For example, in one embodiment metadata tags inserted into the document by document originator 100 at the time of creation provide an indication of how configuration module 350 should mark signature and data fields. In an alternative embodiment, document originator 100 marks the fields manually after document has been provided to, and optionally analyzed by, electronic signature server 300.

In certain embodiments configuration module 350 also designates a method of recording an assent that is to be provided by document recipient 200. See reference numeral 1400 in FIG. 2. This method is optionally associated with one or more of the previously-identified signature fields, such that upon receiving the document, recipient 200 can click on or otherwise select a signature field to invoke the designated method for recording the assent. In some cases configuration module 350 designates the method of recording the assent based on a predefined default setting, such as a global default recording method for all document recipients, or a default recording method associated with a particular document recipient or class of document recipients. For example, document recipients within a first legal jurisdiction may be required to provide an assent that is recorded via audio recording, while document recipients within a second legal jurisdiction may be required to provide an assent that is recorded via audiovisual recording. In other cases configuration module 350 designates the method of recording the assent based on a command received from document originator 100. FIG. 2 illustrates three example methods of recording a spoken or gesticulated assent from document recipient 200, each of which will be described in turn.

For instance, in certain implementations configuration module 350 specifies that the document recipient's spoken assent is to be recorded via an audio recording. See reference numeral 1410 in FIG. 2. In other implementations configuration module 350 specifies that the document recipient's spoken assent is to be recorded via an audiovisual recording. See reference numeral 1420 in FIG. 2. In either case, configuration module 350 designates a particular phrase or sequence of words that comprises the spoken assent. The phrase or sequence of words can be generated automatically (such as by selecting a pre-established phrase or a sequence of randomly chosen words) or it can be generated based on input received from document originator 100. In still other embodiments no specific phrase is specified, in which case document recipient 200 may record a phrase of his/her own choosing. In still other implementations configuration module 350 specifies that a document recipient's gesticulated assent is to be recorded via a visual recording. See reference numeral 1430 in FIG. 2. The gesticulated assent may comprise a sequence of gestures that are randomly selected by configuration module 350 or that are specified by document originator 100. For example, six gestures randomly selected from a collection of fifty available gestures would produce over ten billion possible six-gesture permutations. Example gestures which can be used in such embodiments include moving the face or hands in a specified way, nodding the head, or positioning the arms, thumbs, or fingers in a specified way. In some cases a recorded assent may include both non-verbal gestures and spoken cues, thus further increasing the number of possible permutations. Using a verbal and/or gesticulated assent that is selected from a large or virtually unlimited set of permutations increases security by making it difficult to reuse a previously recorded response, such as a simple phrase like "I agree", that may have been recorded for a different purpose. Security can also be increased by requiring that the recording be generated by an application that is native to electronic signature server 300 so that prerecorded assent steps are not used by an unauthorized party.

In addition to designating how an assent is to be recorded, configuration module 350 also optionally generates instructions for document recipient 200 with respect to how to record the assent. As set forth herein, such instructions may comprise a natural language statement that specifies a phrase, sequence of words, and/or one or more gestures that document recipient 200 should record. The instructions are optionally specifically tailored for a particular document recipient, and thus may include personally identifying information such as the document recipient's name, address, identification number, or other information. For example, in one embodiment the instructions comprise the statement, "Please state your name and birthdate, place your right hand over your heart, and say, 'I, John Doe, agree to the terms of this employment agreement ID51'". In other embodiments document originator 100 specifies the instructions which are to be provided to document recipient 200. Regardless of how they are generated, the instructions can be embedded into the document itself, or they can be stored separate from the document in a network-accessible location.

Configuration module 350 also optionally designates one or more authentication standards for the recorded assent. In some cases an authentication standard is designated based on a predefined default standard, such as a global default standard that is uniformly applied to all documents and/or document recipients. In other cases an authentication standard is designed based on a default standard that is associated with a particular document recipient, a particular class of document recipients, or a particular document type. The authentication standard for a particular recorded assent may depend in part on whether the assent comprises an audio recording, a visual recording, or an audiovisual recording. In alternative embodiments configuration module 350 designates the authentication standard based on a command received from document originator 100.

For example, in the case of an assent that includes an audio component, configuration module 350 can designate that a voiceprint should be extracted from the audio recording. If the extracted voiceprint matches or substantially matches a voiceprint that is saved in voiceprint repository 710 or that is otherwise obtained by authentication services 700, then the recorded assent is considered to be an authenticated electronic signature. In such implementations the voiceprints can be considered to be substantially matching where there exists a reasonably high likelihood that they were generated by the same person. The voiceprint saved in voiceprint repository 710 can be provided as part of an initial registration process, or it can be culled from sounds recorded from prior interactions the signatory may have had with the electronic signature service or other online services. In some cases a recorded assent must be reviewed and/or approved by document originator 100 before it can be authenticated, as will be described in turn. In the case of an assent that includes an audiovisual component, configuration module 350 can designate that a facial image of the signatory should be extracted from the recorded assent. If the extracted facial image matches or substantially matches a corresponding facial image that is stored in face image repository 720, or that is otherwise obtained from authentication services 700, then the recorded assent is considered to be an authenticated electronic signature. In such implementations a facial image can be considered to be substantially matching where there exists a reasonably high likelihood that the facial images are of the same person. The facial image saved in face image repository 720 can be provided as part of an initial registration process, or it can be culled from audiovisual recording from prior interactions the sign may have had with the electronic signature server or other online services such as social media services. In some cases a recorded audiovisual assent must be reviewed and/or approved by document originator 100 before it can be authenticated, as will be described in turn.

Referring again to FIG. 2, once the method of recording an assent from document recipient 100 has been defined, communications module 340 can be configured to send instructions for accessing the document and recording an assent to document recipient 200. See reference numeral 1500 in FIG. 2. For example, in one embodiment an address corresponding to a location where the document is stored in networked document repository 500 is provided to document recipient 200, while in other embodiments the document itself is provided to document recipient 200. Instructions for recording an assent can be provided in any form that is appropriate for document recipient 200, including in the form of textual instructions or in the form of an audio recording or in the form of an audiovisual recording. In certain embodiments access permissions associated with document recipient 200 are checked before sending document recipient 200 instructions for accessing the document.

Once a document has been configured for an electronic signature processing workflow, the document can be provided to document recipient 200 for electronic signature. To this end, FIGS. 3A through 3C comprise a flowchart illustrating example method 2000 for soliciting and authenticating an oral and/or visual electronic signature on a document. Method 2000 commences with document recipient 200 receiving document access and assent recording instructions, as described herein in conjunction with FIG. 2. See reference numeral 2100 in FIG. 3A. This allows document recipient 200 to access and review the document as well as the assent recording instructions. The document can be reviewed in any suitable application, such as in a web browser, in an application specifically associated with the document itself (such as a proprietary word processing application used to create the document), or in a viewer application that is native to electronic signature server 300. Based on such review, document recipient 200 decides whether or not to assent to the document terms. See reference numeral 2110 in FIG. 3A.

If document recipient 200 elects not to assent to the document terms, document status module 370 updates a status associated with the document for purposes of recording the refusal to assent. See reference numeral 2112 in FIG. 3A. Communications module 340 is optionally configured to send a refusal notification to document originator 100. See reference numeral 2114 in FIG. 3A. If, on the other hand, document recipient 200 elects to assent to the document terms, interactivity module 360 can be configured to record the assent that is received from document recipient 200. The assent can be recorded in accordance with instructions generated by configuration module 350. See reference numeral 2116 in FIG. 3A. Geolocation data associated with the recorded assent is also optionally recorded. See reference numeral 2118 in FIG. 3A. In some applications geolocation data can be used as part of the assent authentication process, such as by presenting such data to document originator 100 for review. Along these same lines, geolocation data may also be used to create an audit trail associated with a recorded assent. Timestamp data can be also recorded for similar purposes. Other identifying data associated with recipient's device 210, such as a device identifier, a model number, a form factor, or a network address can additionally or alternatively be recorded for similar purposes. In general, interactivity module 360 can be understood as being able to control certain hardware associated with recipient's device 210, so that features such as location services 212, microphone 214, and/or camera 216 can be activated and leveraged.

Interactivity module 360 can be configured to determine whether the assent includes recorded audio. See reference numeral 2200 in FIG. 3B. If not, processing can continue to allow document originator 100 to review a gesticulated assent, as illustrated in FIG. 3C and as discussed in turn. However, if the assent does include recorded audio, authentication services 700 are optionally configured to retrieve reference voiceprint data for document recipient 200 from a reference source, such as from voiceprint repository 710. See reference numeral 2210 in FIG. 3B. The voiceprint saved in voiceprint repository 710 can be provided as part of an initial registration process, or it can be culled from sounds recorded from prior interactions the signatory may have had with the electronic signature service or other online services such as social networking services. For example, in one embodiment the voiceprint saved in voiceprint repository 710 is extracted from social network content associated with the document recipient. This reference voiceprint data can be compared with a voiceprint extracted from the recorded assent. See reference numeral 2220 in FIG. 3B.

A comparison between a reference voiceprint and a voiceprint extracted from a recorded assent provides a first indicator with respect to whether an assent that includes recorded audio should be authenticated. In some cases, interactivity module 360 is configured to provide document originator 100 with an opportunity to independently authenticate a recorded assent regardless of the outcome of this voiceprint comparison. See reference numeral 2230 in FIG. 3B. In such case processing can continue to allow document originator 100 to review the recorded audio assent, as illustrated in FIG. 3C and as discussed in turn. However, where document originator 100 is not provided with an opportunity to authenticate the recorded assent, interactivity module 360 can determine whether the recorded assent is authenticated based on the recorded assent itself. See reference numeral 2240 in FIG. 3B. This determination can be made, for example, based on the configuration defined by configuration module 350. For example, in one embodiment such a determination is based on the voiceprint comparison disclosed herein and illustrated in FIG. 3B. In another embodiment such a determination is based on comparing a speech-to-text transcription of the recorded assent with a phrase specified in the authentication instructions specified by configuration module 350. Such a transcription may be provided by speech-to-text module 620. The specific standards for determining whether the recorded assent should be authenticated can be specified by configuration module 350, optionally based on input from document originator 100.

A comparison between a reference facial image and a facial image extracted from a recorded assent provides an indicator with respect to whether an assent that includes a visual recording should be authenticated. In particular, if the extracted facial image matches or substantially matches a corresponding facial image that is stored in face image repository 720, or that is otherwise obtained from authentication services 700, then the recorded assent is considered to be an authenticated electronic signature. Likewise, a comparison between a reference gesture and a gesture extracted from a recorded assent provides yet another indicator with respect to whether an assent that includes a visual recording should be authenticated. Comparison of a facial image or an extracted gesture are examples of an automated visual authentication process. Thus a modified embodiment method 3000 can be configured such that a visual recording of an assent can be authenticated without review by document originator 100, and therefore such review by document originator 100 can be considered optional. In such embodiments authentication services 700 can be configured to perform such automated visual authentication in addition to, or instead of, the voiceprint authentication indicated by reference numerals 2210 and 2220 in FIG. 3B. Authentication services 700 can be configured to perform such automated visual authentication regardless of whether the assent includes recorded audio. See reference numeral 2205 in FIG. 3B. In addition, in embodiments where an automated visual authentication is performed, the subsequent review by document originator 100 can be considered optional.

Regardless of the specific authentication standards which are applied, if the assent cannot be authenticated then document recipient 200 can be provided with document access and assent recording instructions again, thereby providing another opportunity to assent to the document terms. See reference numeral 2100 in FIG. 3A. In some cases if document recipient 200 submits a recorded assent that cannot be authenticated multiple times, document recipient 200 is prevented from recording additional assents.

On the other hand, if the assent can be authenticated, document status module 370 updates a status associated with the document for purposes of recording the authenticated assent. See reference numeral 2330 in FIG. 3C. In some applications the authenticated recorded assent can be considered to be a legally binding electronic signature. The authenticated recorded assent can be archived, for example in networked document repository 500. In embodiments where geolocation and other identifying data associated with the recorded assent is available, such data can be archived as well. See reference numeral 2340 in FIG. 3C. This facilitates the generation of a robust audit trail for a recorded assent and the resulting electronic signature. In some cases document recipient 200 is provided with a confirmation copy of the recorded assent before the document status is updated, thereby providing document recipient 200 with an additional opportunity to confirm his/her assent. Communications module 340 is optionally configured to send an acceptance notification to document originator 100, and optionally to document recipient 200 as well. See reference numeral 2350 in FIG. 3C. In some embodiments the notification also includes a link to the recorded assent itself. The signed document is optionally modified to indicate that an authenticated recorded assent is associated with the document, as will be described in turn. The recorded assent is optionally embedded in the document as an attachment or other supplemental content.

As described herein, in certain embodiments, document originator 100 is afforded an opportunity to review and independently authenticate a recorded, spoken and/or gesticulated assent. In such embodiments communications module 340 sends the recorded audio, video and/or audiovisual assent to document originator 100. See reference numeral 2300 in FIG. 3C. In embodiments where the document originator may not be aware of the spoken and/or gesticulated assent defined by configuration module 350, the assent recording instructions generated by configuration module 350 can be sent to document originator 100 as well. In implementations where an audio authentication was performed, for example as could be based on a voiceprint comparison or a transcribed textual comparison, communications module 340 can be further configured to send the outcome of such comparison to document originator 100 to further assist in deciding whether to authenticate the recorded assent. See reference numeral 2310 in FIG. 3C. Likewise any geolocation data that may have been recorded may also be sent to document originator 100. Document originator 100 can use the received information to independently determine whether to authenticate the recorded assent. See reference numeral 2320 in FIG. 3C. In particular, if document originator 100 authenticates the recorded assent, document status processing can proceed as illustrated in FIG. 3C and as described herein. On the other hand, if document originator 100 does not authenticate the recorded assent, document recipient 200 can be provided with document access and assent recording instructions again, thereby providing another opportunity to assent to the document terms. See reference numeral 2100 in FIG. 3A. In some cases if document recipient 200 submits a recorded assent that cannot be authenticated multiple times, document recipient 200 is prevented from recording additional assents.

In some cases the solicitation of an electronic signature can be enhanced with certain security features that reduce the likelihood that the received electronic signature will be fraudulent or unauthorized. One example of such an enhanced security feature is a requirement that document recipient 200 accept assent recording instructions and/or record an assent within a specified timeframe. To this end, FIG. 4 is a flowchart illustrating example method 3000 for soliciting an oral and/or visual electronic signature on a document within a predetermined timeframe. Method 3000 commences with document recipient 200 receiving instructions for recording an assent, such as may be defined by configuration module 350. See reference numeral 3100 in FIG. 4. In one embodiment document recipient 200 should accept the assent recording instructions within a first timeframe. Interactivity module 360 can be configured to make such a determination. See reference numeral 3200 in FIG. 4. If the assent recording instructions are not accepted in a timely fashion, configuration module 350 generates a modified set of assent recording instructions. See reference numeral 3050 in FIG. 4. If document recipient 200 accepts the assent recording instructions within the first timeframe, he/she should still record the assent within a second timeframe. Once again, interactivity module 360 can be configured to make this determination. See reference numeral 3300 in FIG. 4. If the assent is not recorded in a timely fashion, configuration module 350 generates a modified set of assent recording instructions. See reference numeral 3050 in FIG. 4. On the other hand, if the assent recording instructions are accepted within the first predetermined time period and the assent itself is recorded within the second predetermined time period, the recorded assent can be processed as described herein. See reference numeral 3400 in FIG. 4. In various embodiments the first and second predetermined time periods are less than three minutes, less than two minutes, less than one minute, less than 30 seconds, less than 15 seconds, or less than 10 seconds. Other longer or shorter predetermined time periods can be used in other embodiments.

While FIG. 4 illustrates a configuration wherein the assent recording instructions should be accepted within a first predetermined time period and the assent itself should be recorded within a second predetermined time period, alternative configurations can be implemented in other embodiments. For example, in one alternative implementation the assent recording instructions should be accepted within the first predetermined time period and no time restriction is placed on recording the assent itself. In another alternative implementation no time restriction is placed on accepting the assent recording instructions, or the assent recording instructions need not be accepted at all, while the assent itself must be recorded within the second predetermined time period. In general, invoking a requirement that document recipient 200 accept assent recording instructions and/or record an assent within a specified timeframe can increase the security of an electronic signature workflow by limiting a fraudster's opportunity to attempt to spoof or otherwise generate an illegitimate electronic signature. However alternative embodiments call for assent recording instructions to be accepted without any timeframe in which such acceptance must be received. Regardless of whether a timeframe is established for accepting the assent recording instructions, in certain embodiments the document recipient's acceptance of such instructions is provided to document originator 100 along with the recorded assent itself.

In some implementations, document originator 100 and/or document recipient 200 may wish to modify an electronically signed document in a way that visually indicates that an authenticated assent has been recorded for the electronic signature. In these cases, an authenticated signatory's name is placed on the document in a location where a signature might normally be placed. For example, FIG. 5A illustrates an example graphical representation of a document 510 that is associated with an authenticated oral electronic signature, wherein document 510 includes a vocal waveform 225 of an authenticated signatory. FIG. 5B illustrates an example graphical representation of a document 520 that is associated with an authenticated visual electronic signature, wherein document 520 includes an image snapshot 227 of an authenticated signatory. Image snapshot 227 may comprise, for example, a still image extracted from a visual recording of the document recipient's authenticated assent. In both FIGS. 5A and 5B, an authenticated signatory's name 220 appears adjacent to waveform 225 or snapshot 227, respectively. In such embodiments vocal waveform 225 and image snapshot 227 function as a visual indicia that an authenticated assent has been recorded and is available for inspection. In modified embodiments other visual indicia can be used for this purpose. The visual indicia may also be positioned differently, such as in a margin of the document or as a watermark printed behind authenticated signatory's name 220.

CONCLUSION

Numerous variations and configurations will be apparent in light of this disclosure. For instance one example embodiment provides a computer-implemented document processing method that comprises receiving, from a document originator, metadata that identifies a document that is to be distributed to a document recipient as part of a workflow. The document includes a plurality of document terms. The method further comprises designating a sequence comprising a plurality of gestures that signifies assent to the document terms. The method further comprises providing, to the document recipient in response to a received request, instructions for generating a recorded assent to the document terms. The recorded assent comprises a visual recording of the document recipient performing the sequence of gestures. The method further comprises providing, to the document originator, access to the recorded assent. The method further comprises receiving, from the document originator, an authentication of the recorded assent. In some cases (a) the recorded assent comprises an audiovisual recording of the document recipient; (b) the method further comprises adding a visual indicia to the document in response to receiving the authentication of the recorded assent; and (c) the visual indicia comprises an image snapshot extracted from the audiovisual recording. In some cases the method further comprises sending a notification in response to receiving the authentication of the recorded assent. In some cases the method further comprises recording geolocation data that corresponds to a geographic location where the recorded assent was generated. In some cases the method further comprises (a) recording geolocation data that corresponds to a geographic location where the recorded assent was generated; and (b) providing the geolocation data to the document originator along with access to the recorded assent. In some cases the method further comprises sending a notification in response to receiving the authentication of the recorded assent, wherein the notification includes a hyperlink providing access to the recorded assent. In some cases the received request is a request (a) that is received from the document originator, and (b) to solicit the recorded assent from the document recipient. In some cases the received request is a request (a) that is received form the document recipient, and (b) to obtain the instructions for generating the recorded assent.

Another example embodiment provides an electronic signature system that comprises a document repository storing (a) a document comprising a plurality of document terms, (b) instructions for generating a recorded assent to the document terms, and (c) metadata indicating a status of the document with respect to a workflow. The system further comprises a configuration module configured to generate the instructions in response to a request received from a document originator. The instructions define a verbal assent and a gesticulated assent. The system further comprises an interactivity module configured to receive a recorded assent from a document recipient. The recorded assent comprises an audiovisual recording of the verbal assent and the gesticulated assent. The interactivity module is further configured to authenticate the recorded assent based at least in part on a voiceprint extracted from the verbal assent. In some cases the system further comprises a speech-to-text module configured to generate a transcription of the verbal assent, wherein the interactivity module is further configured to authenticate the recorded assent based at least in part on a comparison of the transcription with an instructed phrase set by the configuration module. In some cases the system further comprises a document status module that is configured to modify the metadata in response to authentication of the recorded assent. In some cases the system further comprises a document status module configured to define a logical association between the authenticated recorded assent and the document. In some cases (a) the verbal assent comprises a phrase indicating that the document recipient has assented to the document terms; and (b) the interactivity module is further configured to compare the voiceprint extracted from the verbal assent with a voiceprint of an authorized document signer. In some cases (a) the interactivity module is further configured to compare the voiceprint extracted from the verbal assent with a voiceprint of an authorized document signer; and (b) the voiceprint of the authorized document signer is extracted from social network content associated with the authorized document signer. In some cases (a) the interactivity module is further configured to compare the voiceprint extracted from the verbal assent with a voiceprint of an authorized document signer; and (b) the interactivity module authenticates the recorded assent only if the extracted voiceprint substantially matches the voiceprint of the authorized document signer. In some cases the system further comprises a speech-to-text module configured to generate a transcription of the verbal assent, wherein the interactivity module is further configured to authenticate the recorded assent based at least in part on a comparison of the transcription with an instructed phrase set by the configuration module Another example embodiment provides a computer program product encoded with instructions that, when executed by one or more processors, causes a document workflow process to be carried out. The process comprises receiving, from a document originator, metadata that identifies a document that is to be distributed to a document recipient as part of a workflow. The document includes a plurality of document terms. The process further comprises designating a sequence comprising a plurality of gestures that signifies assent to the document terms. The process further comprises providing, to the document recipient in response to a received request, instructions for generating a recorded assent to the document terms. The recorded assent comprises a visual recording of the document recipient performing the sequence of gestures. The process further comprises providing, to the document originator, access to the recorded assent. In some cases the process further comprises determining whether an acceptance of the instructions is received within a first predetermined time period of providing the instructions to the document recipient. In some cases the process further comprises (a) obtaining the recorded assent from the document recipient; and (b) determining whether the recorded assent is obtained within a second predetermined time period of providing the instructions to the document recipient. In some cases the sequence comprising the plurality of gestures is designated based on a selection of gestures provided by the document originator. In some cases the sequence comprising the plurality of gestures is designated by making a random selection of gestures from a library of gestures. In some cases (a) the process further comprises designating a spoken phrase that further signifies assent to the document terms; and (b) the recorded assent comprises a visual recording of the document recipient performing the sequence of gestures and speaking the spoken phrase.

The foregoing description has been presented for the purposes of illustration and description. It is not intended to be exhaustive or to limit the invention to the particular disclosed embodiments. Many modifications and variations are possible in light of this disclosure. Thus it is intended that the scope of the invention be limited not by this detailed description, but rather by the claims appended hereto. This disclosure is related to U.S. patent application Ser. No. 14/069,674 (filed 1 Nov. 2013), the entire disclosure of which is hereby incorporated by reference herein.

What is claimed is:

1. A computer-implemented document processing method comprising:
 receiving, from a document originator, metadata that identifies a document that is to be distributed to a document recipient as part of a workflow, wherein the document includes a plurality of document terms;
 designating a sequence comprising a plurality of gestures that signifies assent to the document terms;
 providing, to the document recipient in response to a received request, instructions for generating a recorded assent to the document terms, wherein the recorded assent comprises a visual recording of the document recipient performing the sequence of gestures;
 providing, to the document originator, access to the recorded assent; and
 receiving, from the document originator, an authentication of the recorded assent.

2. The method of claim 1, wherein:
 the recorded assent comprises an audiovisual recording of the document recipient;
 the method further comprises adding a visual indicia to the document in response to receiving the authentication of the recorded assent; and
 the visual indicia comprises an image snapshot extracted from the audiovisual recording.

3. The method of claim 1, further comprising recording geolocation data that corresponds to a geographic location where the recorded assent was generated.

4. The method of claim 1, further comprising:
 recording geolocation data that corresponds to a geographic location where the recorded assent was generated; and
 providing the geolocation data to the document originator along with access to the recorded assent.

5. The method of claim 1, further comprising sending a notification in response to receiving the authentication of the recorded assent, wherein the notification includes a hyperlink providing access to the recorded assent.

6. The method of claim 1, wherein the received request is a request (a) that is received form the document recipient, and (b) to obtain the instructions for generating the recorded assent.

7. An electronic signature system that comprises:
 a document repository storing (a) a document comprising a plurality of document terms, (b) instructions for generating a recorded assent to the document terms, and (c) metadata indicating a status of the document with respect to a workflow;
 a configuration module configured to generate the instructions in response to a request received from a document originator, wherein the instructions define a verbal assent and a gesticulated assent; and
 an interactivity module configured to receive a recorded assent from a document recipient, wherein the recorded assent comprises an audiovisual recording of the verbal assent and the gesticulated assent, and wherein the interactivity module is further configured to authenticate the recorded assent based at least in part on a voiceprint extracted from the verbal assent.

8. The electronic signature system of claim 7, further comprising a speech-to-text module configured to generate a transcription of the verbal assent, wherein the interactivity module is further configured to authenticate the recorded assent based at least in part on a comparison of the transcription with an instructed phrase set by the configuration module.

9. The electronic signature system of claim 7, further comprising a gesture recognition module configured to recognize a gesture included in the recorded assent, wherein the interactivity module is further configured to authenticate the recorded assent based at least in part on a comparison of the recognized gesture with a preapproved gesture included in the gesticulated assent defined by the configuration module.

10. The electronic signature system of claim 7, further comprising a document status module that is configured to modify the metadata in response to authentication of the recorded assent.

11. The electronic signature system of claim 7, further comprising a document status module configured to define a logical association between the authenticated recorded assent and the document.

12. The electronic signature system of claim 7, wherein:
 the verbal assent comprises a phrase indicating that the document recipient has assented to the document terms; and
 the interactivity module is further configured to compare the voiceprint extracted from the verbal assent with a voiceprint of an authorized document signer.

13. The electronic signature system of claim 7, wherein:
 the interactivity module is further configured to compare the voiceprint extracted from the verbal assent with a voiceprint of an authorized document signer; and
 the voiceprint of the authorized document signer is extracted from social network content associated with the authorized document signer.

14. The electronic signature system of claim 7, wherein:
 the interactivity module is further configured to compare the voiceprint extracted from the verbal assent with a voiceprint of an authorized document signer; and
 the interactivity module authenticates the recorded assent only if the extracted voiceprint substantially matches the voiceprint of the authorized document signer.

15. A non-transitory computer readable medium having instructions encoded thereon that, when executed by one or more processors, cause a document workflow process to be carried out, the process comprising:
 receiving, from a document originator, metadata that identifies a document that is to be distributed to a document recipient as part of a workflow, wherein the document includes a plurality of document terms;
 designating a sequence comprising a plurality of gestures that signifies assent to the document terms;
 providing, to the document recipient in response to a received request, instructions for generating a recorded assent to the document terms, wherein the recorded assent comprises a visual recording of the document recipient performing the sequence of gestures; and
 providing, to the document originator, access to the recorded assent;
 wherein the received request is a request received from the document recipient to obtain the instructions for generating the recorded assent.

16. The non-transitory computer readable medium of claim 15, wherein the process further comprises determining whether an acceptance of the instructions is received within a first predetermined time period of providing the instructions to the document recipient.

17. The non-transitory computer readable medium of claim 15, wherein the process further comprises:
   obtaining the recorded assent from the document recipient; and
   determining whether the recorded assent is obtained within a second predetermined time period of providing the instructions to the document recipient.

18. The non-transitory computer readable medium of claim 15, wherein the sequence comprising the plurality of gestures is designated based on a selection of gestures provided by the document originator.

19. The non-transitory computer readable medium of claim 15, wherein the sequence comprising the plurality of gestures is designated by making a random selection of gestures from a library of gestures.

20. The non-transitory computer readable medium of claim 15, wherein:
   the process further comprises designating a spoken phrase that further signifies assent to the document terms; and
   the recorded assent comprises a visual recording of the document recipient performing the sequence of gestures and speaking the spoken phrase.

* * * * *